Sept. 1, 1964  C. E. SAUNDERS, JR  3,146,634
FORCE MULTIPLIER HEAVY DUTY MANIPULATOR HANDLE
Filed April 1, 1960  3 Sheets-Sheet 1
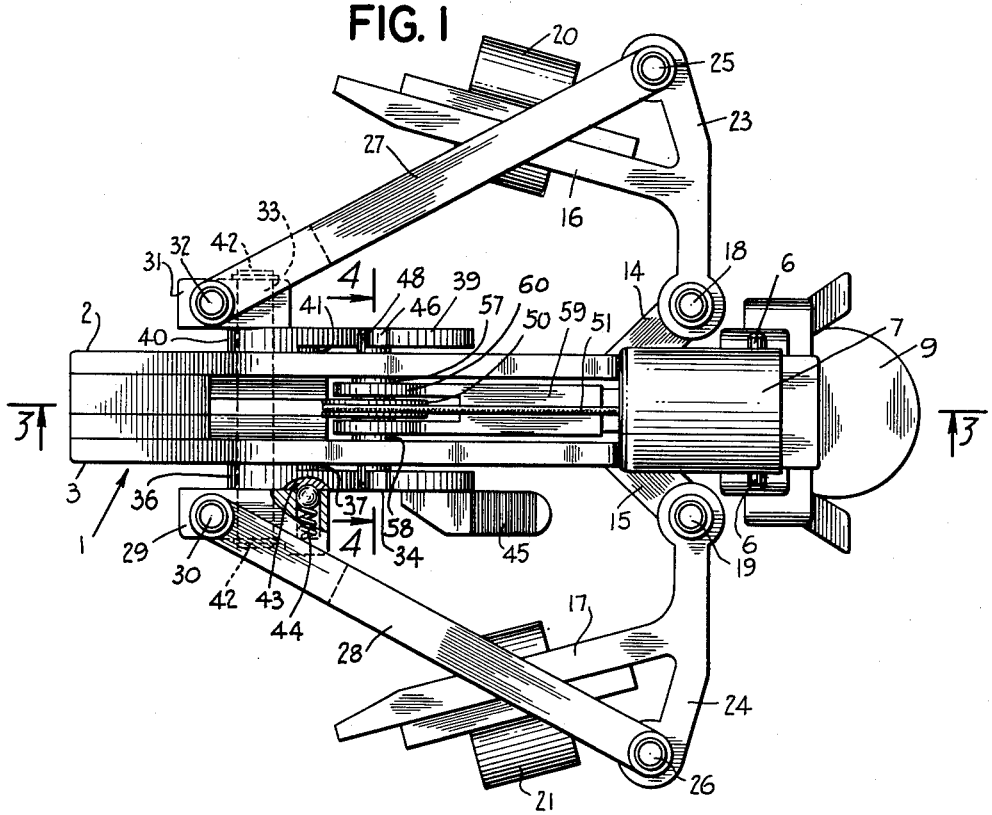
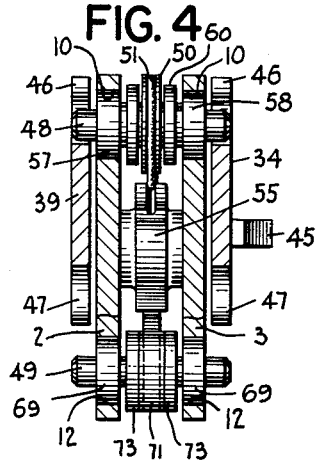
INVENTOR.
CHARLES EDWARD SAUNDERS JR.
BY
*William A. Drucker*
ATTORNEY

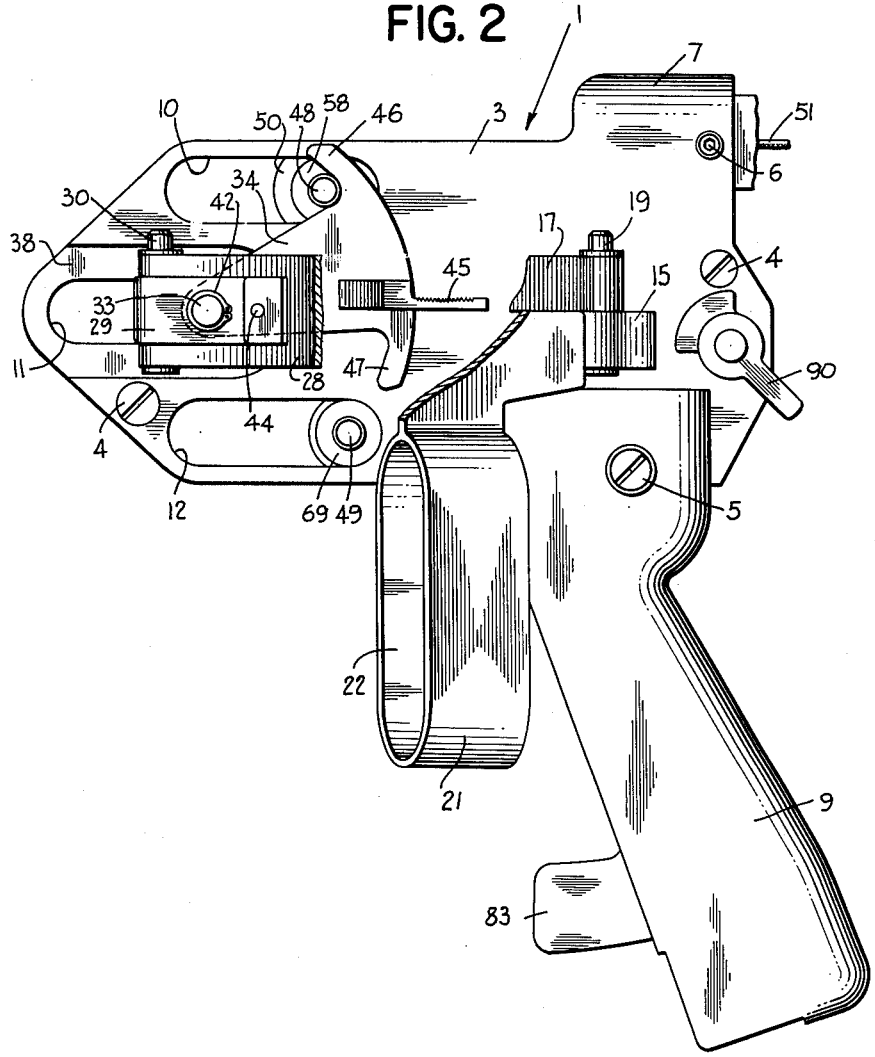

Sept. 1, 1964　　　C. E. SAUNDERS, JR　　　3,146,634
FORCE MULTIPLIER HEAVY DUTY MANIPULATOR HANDLE
Filed April 1, 1960　　　3 Sheets-Sheet 3

*INVENTOR.*
CHARLES EDWARD SAUNDERS JR.
BY
*William A. Drucker*
*ATTORNEY*

3,146,634
FORCE MULTIPLIER HEAVY DUTY
MANIPULATOR HANDLE
Charles Edward Saunders, Jr., Port Chester, N.Y., assignor to American Machine & Foundry Company, Inc., a corporation of New Jersey
Filed Apr. 1, 1960, Ser. No. 19,277
7 Claims. (Cl. 74—501)

This invention relates to a force multiplier, especially to a manually operated device for increasing a gripping force, and particularly to a handle device which permits multiplication and/or incremental increase in the transmitted force of a grip or squeeze applied at the handle.

Force multiplying and transmitting devices have many applications, e.g., in brake systems, presses, holders, clamps and grips. A particularly useful application of the handle device of the present invention is in connection with remote-control or master-slave manipulators such as are necessary when working with noxious materials, for example, radioactive substances. A manipulator of this type is disclosed in Goertz et al. Patent 2,764,301 dated September 25, 1956, to which reference is made for a detailed showing and explanation of its operation. Briefly, the manipulator is of the type by which movements of a handle engaged by an operator are reproduced in a claw or grasper engaging an article to be manipulated. The handle and grasper are connected to the lower ends of vertical master and slave arms mounted on the ends of a horizontal support extending through a wall barrier. In addition to duplicating the movements of the handle in tongs or grips at the slave end of the manipulator, it is necessary to transmit the grip or squeeze at the handle to the tongs by means of a cable thereby to close the jaws of the tongs on the article to be manipulated.

In many cases the usual force of a finger or hand grip which is transmitted from the handle to the tongs is inadequate when handling heavy objects so that some means are necessary for increasing or multiplying the force applied at the handle. Moreover, it is tiresome to maintain the hand or finger grip at the handle while performing all the other manipulations required of the operator and, in addition, the operator may inadvertently loosen his grip while preoccupied with the manipulation of an article. Therefore, means for locking an applied grip in such a way that it might be released would be advantageous.

According to the present invention, a device is provided for multiplying and transmitting a gripping force in a remote control manipulator wherein said gripping force is transmitted to a remote mechanism operable by cable tension, which device includes a hand lever pivoted on a hand grip, a tension cable extending from within said grip to said remote mechanism, said cable and lever being intercoupled by a transmission comprised of two kinemetic trains defining primary and secondary transmission systems, the latter having a greater mechanical advantage, and shifting means between said transmission systems. Releasable cable tension retaining means are provided to permit shifting between transmission systems. The transmission system having the greater mechanical advantage includes at least a part of the primary transmission system.

In accordance with the foregoing a handle is provided for transmitting a finger squeeze to a remote point of application, e.g., by means of a cable running from the handle to a gripping or other force applying device, in which handle a pair of levers are adapted to be squeezed together by means of the operator's thumb and fingers to slide transversely the shaft of a pulley around which the force transmitting cable makes a return bend, one end of the cable being anchored within the handle body and the other coupled to the force transmitting means. The pulley shaft is coupled to a ratchet bar associated with a spring biased pawl whereby the pulley and ratchet bar are releasably held against return displacement after the initial force has been applied and the thumb and finger grips returned to the starting or open position.

The cable end within the handle body is anchored to one arm of a cable lever mounted within the handle body, the lever being fixed against movement during the application of the initial force when sliding the pulley shaft. The means coupling the levers to the pulley shaft are adapted to be shifted to engage the other arm of the cable lever and the lever squeezing step may then be repeated, this time under a mechanical advantage proportional to the cable lever arm ratio, to increase the tension of the cable. A pawl and sliding ratchet bar associated with the cable lever prevents the return of the cable lever and loss of tension in the cable when the finger and thumb levers are released.

A trigger mounted within the grip or palm rest of the handle is linked to one of the two pawls whereby both may be disengaged from their respective ratchet bars by pressing the trigger, the pawl linked to the trigger actuating the other pawl to release the latter upon squeezing the trigger.

Means are included for disengaging both pawls at all times during the squeezing operation on the finger and thumb levers whereby the latter may be operated quickly to apply tension to the cable and release same, especially where rapid manipulation of many light articles is required, as in a remote control manipulator.

The advantages of the invention and the construction, arrangement and combination of the parts thereof will become apparent from the following description of a preferred embodiment with reference to the accompanying drawings in which:

FIG. 1 is a top plan view of the handle;

FIG. 2 is a side elevation thereof, portions being broken away for clarity;

FIG. 4 is a vertical transverse section taken on the line 4—4 of FIG. 1; and

Figure 3:
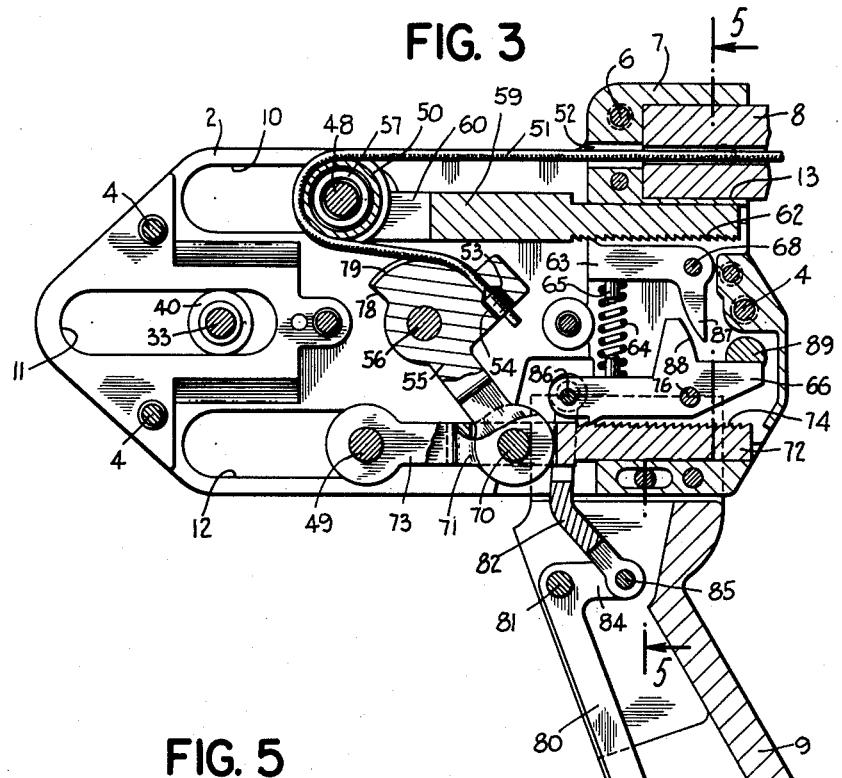
FIG. 3 is a vertical longitudinal section taken on the line 3—3 of FIG. 1.

The handle includes a body 1 made up of complementary wall portions 2, 3 held in assembly by means of various machine screws 4, 5, 6. The body incorporates at its top rear portion a fitting 7 having a bore 13 suitable for mounting the handle on a support 8 received within the bore 13 which support may be, for example, an extension of the wrist joint of the master arm of a remote-control manipulator of the type disclosed in the aforesaid Goertz et al. Patent 2,764,301. A palm rest 9 depends from the lower rear portion of the body 1. The forward end of the body is provided with elongated slots 10, 11, 12 forming tracks for a purpose to be described. Lugs 14, 15 extend in generally opposite directions from the body 1 and provide pivotal supports for the ends of levers 16 and 17 at 18 and 19. Each lever is composed of angularly related portions so that the levers may extend in generally opposite directions from their pivots 18 and 19 and then in a direction generally forward of the handle body to accommodate the thumb and fingers of a human hand when the palm rest 9 is engaged by the palm. One or two fingers may be firmly wrapped around the palm rest 9. The forward extremities of levers 16 and 17 are respectively provided with depending finger or thumb grips 20 and 21 provided with openings 22 to receive the thumb or fingers as the case may be.

At the junctures of the angularly related portions of the levers there are integral and generally opposite extensions 23 and 24 which terminate in pivots 25 and 26, respectively, for the rear ends of links 27 and 28. The links converge toward the handle body 1, the forward end of link 28 being bifurcated to straddle a generally rectangular block 29 at a pivot pin 30. The forward end of link 27 is similarly bifurcated and straddles a generally rectangular block 31 at a pivot pin 32. The blocks 29 and 31 serve as slidable anchors for the forward ends of links 28 and 27, and for this purpose the blocks are provided with transverse bores to receive a common shaft or pin 33 therethrough, the shaft 33 extending transversely through the slot 11 in each wall of the handle body.

Interposed between block 29 and body wall 3 is a selector plate 34 (for a purpose to be described) which is generally sector-shaped and fixed at its apex to shaft 33 which is received through an integral selector plate boss 36 extending through slot 11. An arcuate guide 37 is formed as an integral part of the boss 36 and is received against an elongated countersunk surface 38 formed around the slot 11 in body wall 3, thereby to guide the selector plate 34 between forward and retracted positions. A similar selector plate 39 is disposed between anchor block 31 and body wall 2, being fixed to shaft 33 and also provided with a boss 40 and arcuate guide 41. Snap rings 42 at each end of shaft 33 hold anchor blocks 29 and 31 and selector plates 34 and 39 in assembled relationship on the shaft 33.

Referring to FIG. 1, selector plate 34 is provided additionally with a pair of indents 43 (only one of which is shown) cooperating with a spring and ball detent 44 in anchor block 29 to permit shifting the two selector plates between two selected positions, for a purpose which will be described hereinafter, this positioning being accomplished by manipulating a knurled thumb or finger lever 45 extending rearwardly from selector plate 34. It should be understood that both selector plates are fixed to shaft 33, whereby shifting of selector 34 accomplishes the same result with selector plate 39. Each selector plate is provided with integral peripheral arcuate extensions 46 and 47 which form with the sides of the selector plates rounded reentrant angles to serve as hooks or catches for engagement with shafts 48 or 49, according to whether the selector plates are in the raised or lowered position.

Figure 5:
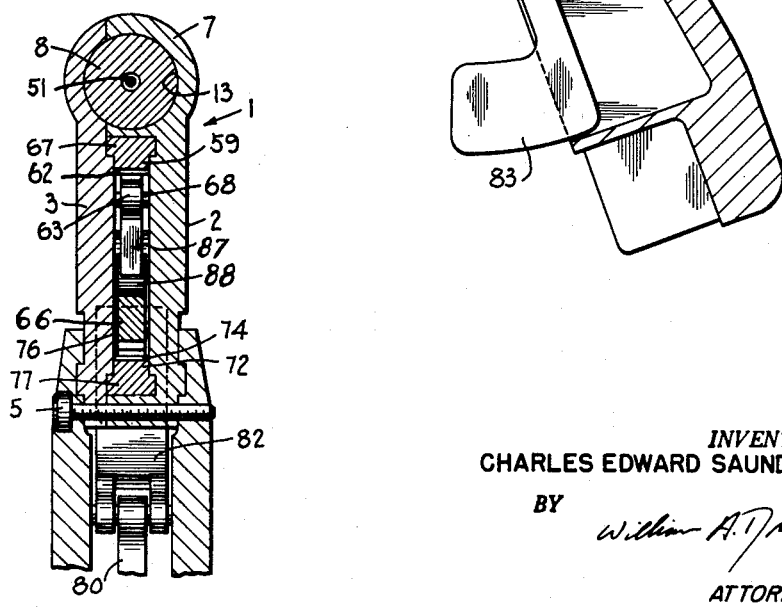
FIG. 5 is a stepped vertical transverse section taken on the line 5—5 of FIG. 3.

As shown in the drawings, the selector plates 34 and 39 are in raised position and engage shaft 48 at the extremities thereof extending through the slots 10 in the walls of the handle body. A pulley 50, which is positioned generally between the walls 2 and 3 of the handle, is mounted on the shaft 48. Over the pulley is disposed a cable 51 that enters the handle through the bore 52 in fitting 7, the cable making a return bend around the pulley and being anchored in a clamp 53 which is lodged within an aperture 54 in a cable lever 55 pivoted on a pin 56 extending between the walls 2 and 3 of the handle body, as shown in FIG. 3. The cable extends to a force applying device (not shown), e.g., to the tongs of a remote-control manipulator in the manner described in the hereinbefore mentioned Goertz et al. Patent 2,764,301. Rollers 57 and 58 are mounted on shaft 48 and disposed within the elongated slots or tracks 10 in the walls 2 and 3 of the handle body to facilitate transverse reciprocation of the shaft 48. A ratchet bar 59, provided with a bifurcated forward end 60 which receives the shaft 48 therethrough and straddles the pulley 50, is disposed within the handle body 1 and underlies the cable 51 where it enters the handle. The rear end of the ratchet bar is provided with a ratchet portion 62 which cooperates with a pawl 63, pivoted at 68, which is normally in engagement under the bias of compression spring 64 working over a pin 65 in the underside of the pawl. The other end of the spring similarly biases a lower pawl 66 for a purpose to be described. The rear or ratchet portion 62 of the ratchet bar 59 has a T-shaped base 67 which is slidably accommodated in a complementary slot in the handle body (FIG. 5).

The first step in the operation of the handle may now be described. As the finger and thumb grips 20 and 21 are squeezed together, the pin 48 and pulley 50 are moved forward, or to the left as viewed in FIGS. 2 and 3, along the slot 10. This motion causes the pulley 50 to draw the cable 51 to the left through bore 52 in fitting 7, the result of which is to apply tension to the cable and thereby transmit a force to a load point, e.g., to close the jaws of tongs in a remote-control manipulator. The ratchet bar 59 is also drawn forward by the shaft 48 during this operation and the pawl and ratchet assembly locks the bar and its coupled pulley 50 in the forward position when the finger grips 20 and 21 are spread apart to retract shaft 33 and its associated selector plates 34 and 39 to their original position. Thus, while the initial applied tension in the cable 51 is maintained, an additional operation may be performed to increase the tension through mechanism now to be described.

As described hereinabove, the selector plates 34 and 39 may be switched clockwise to a low position whereby to engage or catch the shaft 49 which extends through slots 12, in a manner corresponding to the operation on upper shaft 48. This is accomplished by engaging the extremities of shaft 49 with the lower hooks or catches 47 on the selector plates.

The shaft 49 mounts rollers 69 which ride in the slotted tracks 12 in the walls 2 and 3 of the handle body. The shaft 49 is coupled to a pin 70 by means of a link 71, the end of the link receiving the pin 70 being bifurcated and straddling the lower end of cable lever 55, which end also receives the pin 70 therethrough. A ratchet bar 72 in alignment with slotted track 12 has a bifurcated forward end 73 which straddles the ends of pin 70, the lower arm of cable lever 55 and the link 71, and is bored at its forward extremity to receive shaft 49 therethrough. The rear portion of the bar 72 is provided with a ratchet 74 associated with the pawl 66 pivoted at 76 and biased into engagement with the ratchet by compression spring 64. The ratchet portion 74 is provided with a T-shaped base 77 which is slidably accommodated in a complementary slot in the handle body (FIG. 5).

Referring to FIGS. 2 and 3, it will be noted that, by reason of the rollers 69 being in engagement with the rear end of slotted track 12, the cable lever 55 is in its limiting counterclockwise position, as viewed. It is this feature which renders the cable anchor 53 stationary during the heretofore described operation on upper pulley shaft 48.

Returning to the operation on shaft 49, now engaged by the selector plates 34 and 39, as the finger and thumb grips 20 and 21 are squeezed together, the shaft 49 is moved forward (to the left as viewed in FIGS. 2 and 3) pulling with it the link 71 and the ratchet bar 72. The link 71 rotates the cable lever clockwise, as viewed, thereby pulling cable 51 around pulley 50 to increase the tension in the former. During this operation, the cable 51 wraps around the arcuate end 78 of lever 55, in a groove 79 provided for the purpose. It is to be noted that the mechanical advantage of the cable lever multiplies the force applied and translates this newly derived force into an appreciable increase in the existing tension of cable 51. When the squeezing operation is complete, the finger grips 20 and 21 may be released and opened apart, since the pawl and ratchet means 66 and 74 will maintain the shaft 49 in the forward position against the back tension of cable 51 transmitted through cable lever 55 and link 71.

With the greatly increased cable tension thus provided by the second of the foregoing operations, any apparatus, such as a remote-control manipulator, may be rapidly and easily changed over from standard to heavy duty operation.

Novel means are provided for releasing the cable tension. This is simply accomplished by disengaging the pawls 63 and 66 from their respective ratchet bars 59 and 72. Referring to FIG. 3, there is shown a trigger 80 pivoted at 81 within the palm rest 9 which is seen as being generally U-shaped, the trigger butt 83 extending forwardly out of the palm rest. A bent link 82 connects the short arm 84 of the trigger to the pawl 66 by means of pins 85 and 86, the link being bifurcated at both end portions and straddling the trigger arm 84 and the ratchet bar 72. Pawls 63 and 66 are respectively provided with toe cams 87 and 88 adapted to cooperate to disengage pawl 63 as pawl 66 is disengaged. The action is as follows. By pulling on trigger 80 with the fingers the trigger pivots at 81 to lift the link 82 which correspondingly raises the pawl 66 out of engagement with the ratchet 74 by pivoting the pawl against the bias of the spring 64. As the pawl 66 pivots, its toe cam 88 wipes against the toe cam 87 on pawl 63, causing the latter to pivot against the bias of spring 64 and disengage the ratchet 62. Thus both ratchet bars 59 and 72, being free to slide, are urged rearwardly under the tension of cable 51 until such tension is dissipated.

When it is desired to utilize the handle for moderate or light duty and when rapid manipulation of light articles in a remote-control manipulator, for example, is desired, the ratchets can be rendered inoperative by a cam 89 actuated by a trigger 90 in the rear of the handle body, as shown in FIGS. 2 and 3. If the cam 89 is rotated from the position shown to cause pawl 66 and pawl 63 as well to pivot, as previously explained, the pawls are rendered inoperative and the handle will maintain cable tension only so long as the finger grips 20 and 21 are squeezed. This condition could also be obtained by providing means, such as a set screw (not shown), for locking the first described trigger 80 inside the palm rest 9 after being pressed therein.

While there has been described a preferred embodiment of the invention, it is to understood that various equivalents will readily suggest themselves to those skilled in the art, and the invention is to be restricted only by the scope of the appended claims.

What is claimed is:

1. A device of the character described, comprising a body member, a first longitudinal track in said body, a first shaft transverse to and slidable along said first track, a pulley mounted on said first shaft, a cable extending from within said body and passed around a portion of said pulley, means within said body anchoring one cable end, a second longitudinal track in said body, a second shaft transverse to and slidable along said second track, means on said second shaft releasably linking said first shaft to said second shaft, manually operated lever means coupled to said second shaft sliding said second shaft as well as said first shaft when the latter is linked to the former, whereby the cable may be drawn into the body, and means releasably locking said first shaft in any position of its travel.

2. A device according to claim 1 in which the locking means for the first shaft includes a ratchet bar coupled to and reciprocable with said first shaft, and a spring biased pawl associated with said ratchet bar and pivotally mounted in the body member.

3. A device according to claim 2 which includes a third longitudinal track in the body, a third shaft transverse to and slidable along said third track, the linking means on the second shaft being adapted to be releasably linked to said third shaft whereby to slide transversely, said third shaft upon manual operation of the lever means coupled to said second shaft, and second lever means pivotally mounted in the body and having one arm coupled to said third shaft, the means for anchoring the cable being located in the other arm of said second lever means.

4. A device according to claim 3, including means releasably locking said third shaft in any position of its travel.

5. A device according to claim 4 in which the locking means for the third shaft includes a second ratchet bar coupled to and reciprocable with said third shaft, and a second spring biased pawl associated with said second ratchet bar and pivotally mounted in the body.

6. A force multiplier device comprising a frame, a pulley, a shaft mounting said pulley, a track in said frame mounting said pulley shaft and permitting reciprocation of the shaft transversely of its axis, a cable extending out of said frame and being passed over a portion of said pulley, anchoring means within said frame anchoring one end of said cable, manually operable means on said frame engageable with the pulley shaft and adapted to move the pulley shaft transversely of its axis to draw the cable into the frame, means in said frame releasably securing the pulley shaft against return movement when the manually operable shaft moving means are disengaged, said anchor means including a lever pivotally mounted in said frame, the manually operable means for moving the pulley shaft being engageable with said lever and operable to rotate said lever to draw the cable further into the frame, said manually operable means being shiftable between the pulley shaft and the lever.

7. A device according to claim 6, including means releasably securing the lever against return movement.

References Cited in the file of this patent

UNITED STATES PATENTS

| 181,761 | Borger | Aug. 29, 1876 |
| 2,081,737 | Chittick | May 25, 1937 |
| 2,869,394 | Koehl | Jan. 20, 1959 |

FOREIGN PATENTS

| 471,910 | Great Britain | Sept. 13, 1937 |
| 668,116 | Great Britain | Mar. 12, 1952 |